US012592531B1

(12) United States Patent
Wang et al.

(10) Patent No.: US 12,592,531 B1
(45) Date of Patent: Mar. 31, 2026

(54) POWER PLUG AND CONVERSION SOCKET

(71) Applicant: Zhuhai Tessan Power Technology Co.,Ltd., Zhuhai (CN)

(72) Inventors: HongYuan Wang, Zhuhai (CN); GuiMing Wang, Zhuhai (CN)

(73) Assignee: Zhuhai Tessan Power Technology Co., Ltd., Zhuhai (CN)

( * ) Notice: Subject to any disclaimer, the term of this patent is extended or adjusted under 35 U.S.C. 154(b) by 87 days.

(21) Appl. No.: 19/036,225

(22) Filed: Jan. 24, 2025

(30) Foreign Application Priority Data

Dec. 23, 2024 (CN) ......................... 202423183982.0

(51) Int. Cl.
*H01R 35/04* (2006.01)
*H01R 4/48* (2006.01)
*H01R 24/30* (2011.01)
*H01R 31/06* (2006.01)

(52) U.S. Cl.
CPC ............... *H01R 35/04* (2013.01); *H01R 4/48* (2013.01); *H01R 24/30* (2013.01); *H01R 31/06* (2013.01)

(58) Field of Classification Search
CPC .......... H01R 35/04; H01R 4/48; H01R 24/30; H01R 31/06
See application file for complete search history.

(56) References Cited

U.S. PATENT DOCUMENTS 5,775,921 A * 7/1998 Chou ..................... H01R 24/28 439/21
6,089,921 A * 7/2000 Chou ..................... H01R 35/04 439/640
6,302,743 B1 * 10/2001 Chiu .................... H01R 25/003 439/652
6,595,782 B1 * 7/2003 Hsiao ..................... H01R 39/64 439/23
6,793,499 B1 * 9/2004 Chen ...................... H01R 39/64 439/21
7,255,568 B1 * 8/2007 Wu ........................ H01R 39/64 439/23
7,462,074 B1 * 12/2008 Devlin ................. H01R 13/652 439/106
7,566,223 B2 * 7/2009 Wadsworth ............ H01R 39/64 439/21
7,575,436 B1 * 8/2009 Devlin ................... H01R 24/28 439/21

(Continued)

*Primary Examiner* — Thanh Tam T Le
(74) *Attorney, Agent, or Firm* — ScienBiziP, P.C.

(57) ABSTRACT

A power plug and a conversion socket are provided. The power plug includes a casing defining an accommodating cavity. The accommodating cavity includes a cavity opening. At least two pins are partly received in the accommodating cavity and protrude out of the casing through the cavity opening. The at least two pins are movable relative to the casing. At least two conductive connectors are electrically connected with the at least two pins and movable together with the at least two pins. At least two metal pieces electrical are connected with the at least two conductive connectors. Wherein each metal piece provides a first force and a second force onto the conductive member which is connected with each metal piece, the first force presses the conductive member toward a plug-in direction, the second force presses the conductive toward a direction opposite to the plug-in direction.

16 Claims, 5 Drawing Sheets

(56) References Cited

U.S. PATENT DOCUMENTS

| | | | | |
|---|---|---|---|---|
| 7,914,292 | B2 * | 3/2011 | Honda | H01R 24/66<br>439/21 |
| 7,946,852 | B2 * | 5/2011 | John | H01R 35/04<br>439/21 |
| 7,946,868 | B1 * | 5/2011 | Chen | H01R 35/04<br>439/518 |
| 8,123,528 | B2 * | 2/2012 | Devlin | H01R 35/04<br>439/21 |
| 8,167,622 | B2 * | 5/2012 | Zhou | H01R 35/00<br>439/21 |
| 10,998,667 | B2 * | 5/2021 | Yang | H01R 24/70 |
| 11,901,685 | B2 * | 2/2024 | Hu | H01R 39/64 |

* cited by examiner

POWER PLUG AND CONVERSION SOCKET

RELATED APPLICATIONS

This application claims the benefit of priority to Chinese Patent Application Number 202423183982.0 filed on Dec. 23, 2024, in the China National Intellectual Property Administration. The entire contents of the above-identified application is hereby incorporated by reference.

TECHNICAL FIELD

The present invention relates to the technical field of plugs and sockets, and in particular relates to a rotatable power plug.

BACKGROUND

As one kind of electrical element, a power plug plays an important role in electrically connecting components, which connects to a power socket. In modern society, with popularization and widespread applications of various electrical equipment, such as household appliances, office equipment, industrial equipment, etc., the power plug has become indispensable electrical accessories.

A rotatable power plug is proposed in the related art. The rotatable power plug includes several pin electrodes which are rotatable relative to a housing, so that it allows users to freely adjust a direction and an angle of the pins as needed. Thereby the rotatable power plug has an improved adaption to power sockets which are disposed at different positions and usage scenarios.

However, the above-mentioned power plug still has following shortcomings in specific applications. For example, when the pins rotate, election connections between the wires and the pins and the electrodes are unstable during the rotation of the pins, thereby leading to phenomena such as arc sparks, which pose potential safety risks such as component damage, fire or explosion. An improved power plug is thus required.

BRIEF DESCRIPTION OF DRAWINGS

In order to illustrate the technical solution in embodiments of the present invention more clearly, the following briefly introduces accompanying drawings used in the description of the embodiments. Obviously, the accompanying drawings in the following description are only some embodiments of the present invention. Those of ordinary skill in the art can obtain other accompanying drawings from these accompanying drawings without any creative efforts.

DETAILED DESCRIPTION

Figure 1:
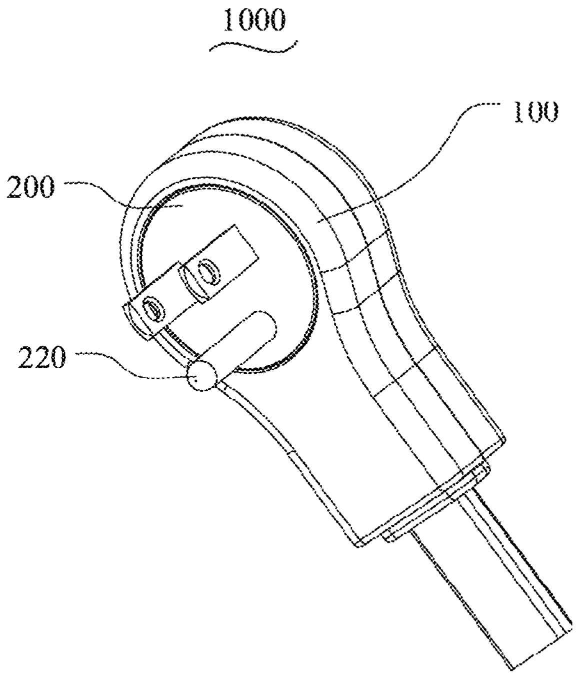
FIG. 1 is a structural diagram of an embodiment of a power plug of the present disclosure.

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

Referring to FIGS. 1 to 6, an embodiment of the present disclosure provides a power plug 1000, which includes a casing 100, a rotatable pin assembly 200, and a power receiving assembly 300. The casing 100 has an accommodating cavity 110. The accommodating cavity 110 has a cavity opening 111 that is configured to be open. The rotatable pin assembly 200 includes a rotatable seat 210, at least two pins 220, and at least two electrically conductive connectors 230. The rotatable seat 210 is rotatably disposed within the accommodating cavity 110. The at least two pins 220 are fastenedly attached to the rotatable seat 210 and exposed out of the casing 100 through the cavity opening 111. The at least two electrically conductive connectors 230 are disposed on the rotatable seat 210 along a plug-in direction of the pins 220, and the at least two electrically conductive connectors 230 are insulated and spaced apart with each other. The at least two pins 220 are electrically connected to the at least two electrically conductive connectors 230 in one-to-one correspondence. The least two electrically conductive connectors 230 rotate together with the at least two pins 220 when the rotatable seat 210 is forced to rotate.

The power connection assembly 300 includes at least two metal pieces 310. The at least two metal pieces 310 are disposed in the accommodating cavity 110 and electrically connected to a cable. The at least two electrically conductive connectors 230 are rotatable relative to the at least two metal pieces 310 under the drive of the rotatable seat 210. The at least two metal pieces 310 are in one-to-one correspondence with the at least two electrically conductive connectors 230. The at least two metal pieces 310 are configured to maintain continuous contact with the corresponding electrically conductive connectors 230.

The casing 100, as a basic structural part of the whole power plug 1000, is internally provided with the accommodating cavity 110, with the cavity opening 111 being open to facilitate installation of other assemblies and subsequent operations such as external connections. The accommodating cavity 110 provides an installation space for the rotatable pin assembly 200 and the power connection assembly 300, serving to receive and position the above assemblies.

The at least two pins 220 are mounted on the rotatable seat 210 and exposed the outside of the casing 100 through the cavity opening 111 for being inserted into a socket, so as to establish a physical connection to an external power source, serving as key contact parts of the power plug 1000 for conduction to an external circuit.

It should be noted that the at least two pins 220 include at least a live pin and a neutral pin, each connected to the corresponding electrically conductive connector 230, wherein the live pin is responsible for transmitting current to provide energy to drive an electrical appliance, and the neutral pin is a current return path, thereby forming a complete circuit to ensure that the current can flow correctly from the power source to the power plug 1000, thus ensuring a stable flow of the current.

Further, the at least two pins 220 may further include a grounding pin, and the at least two electrically conductive connectors 230 includes three electrically conductive connectors 230. The grounding pin is connected to a corresponding electrically conductive connector 230. The grounding pin does not participate in regular power transmissions and circuit operations of the electrical appliances under normal circumstances, but it plays a vital role in the event of electrical leakages and other safety hazards of the electrical appliances. If a metal casing of the electrical appliance is electrified due to internal insulation damage or other reasons, the grounding pin can provide a safe path for the accidental leakage current to directly enter the ground, thus avoiding electric shocks injuries to operators when they touch the metal casing, thus greatly ensuring the safety of both personnel and the electrical appliance.

The number of the metal pieces 310 is same as that of the electrically conductive connectors 230. In this embodiment, there are likewise three metal pieces 310, which are disposed spaced apart in the casing 100 along the plug-in direction of the pins 220 and are insulated and spaced away from each other. The electrically conductive connectors 230 are electrically connected to the pins 220 and the metal pieces in one-to-one correspondence, thus serving as a bridge for conducting current between the pins 220 and the power connection assembly 300, to ensure that the current can be smoothly transferred from the pins 220 to the power connection assembly 300.

Especially, the electrically conductive connectors 230 have the same structure and shape, to reduce the number of parts and production molds for manufacturing the electrically conductive connectors 230. Correspondingly, the metal pieces 310 may also be configured to have the same structure and shape, to reduce the number of parts and production molds for manufacturing the metal pieces 310.

The rotatable seat 210 is rotatably disposed in the accommodating cavity 110 of the casing 100. When the pins 220 are forced to rotate relative to the casing 100, the rotatable seat 210 rotates accordingly, and the electrically conductive connectors 230 are driven to rotate together with the pins 220. Thus, the electrically conductive connectors 230 will rotate relative to the metal pieces 310 under the drive of the rotatable seat 210. Due to an engagement of the metal pieces 310 with the electrically conductive connectors 230, they are continuous in tightly physical contact and electrical connection. Each metal piece 310 may be a clamper which maintains clamping with two opposite surfaces of the corresponding electrically conductive connectors 230 even when the electrically conductive connectors are rotating. Thereby providing a larger contact area and maintaining a more stable contact pressure, which can effectively prevent displacement and loosening of connection parts even during the rotation of the pins 220, so the risk of poor contact is greatly lowered, the phenomenon of power failures caused by poor contact is avoided, and the possibility of generating arc sparks is reduced. This ensures that electrical appliances can continuously and stably receive power supply, while significantly reducing a potential risk of serious safety accidents such as fires or explosions in use of the power plug 1000.

Figure 5:
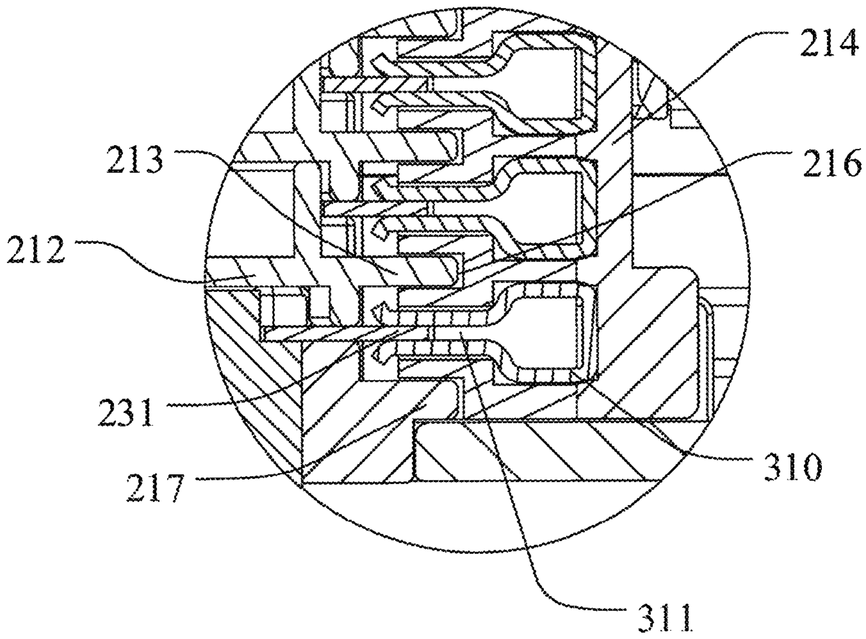
FIG. 5 is an enlarged diagram of portion B in FIG. 4.
Figure 7:
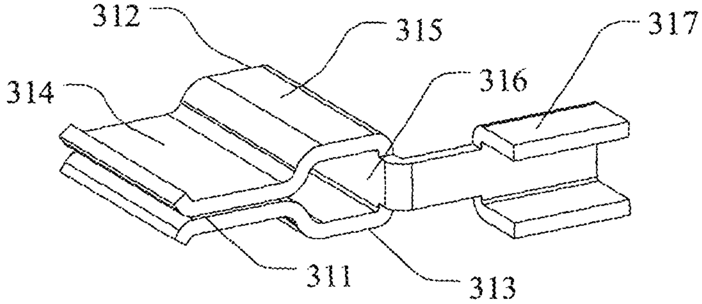
FIG. 7 is a structural diagram of the electrically conductive connector in FIG. 3.

Also referring to FIGS. 5 and 7, in some embodiments, each electrically conductive connector 230 may be a metal plate which has an edge portion 231 exposed out of the rotatable seat 210 from a lateral side when the electrically conductive connector 230 disposed on/above the rotatable seat 210. Each metal piece 310 is elastical. The metal piece 310 may include a first clamping piece, and second clamping piece opposite the first clamping piece and engaging with the first clamping piece to clamp the edge portion 231, and a slot 311 between the first and second clamping pieces is facing the corresponding edge portion 231. The edge portion 231 is insertable into the corresponding slot 311 and electrically connected with the first and second clamping pieces.

The edge portion 231 of the electrically conductive connector 230 extends outwardly from the rotatable seat 210, functioning as a key part for physical contact and electrical conduction with the metal piece 310. Its exposed portion facilitates a cooperative operation with the metal piece 310. Furthermore, when the rotatable seat 210 takes the electrically conductive connector 230 to rotate, the edge portion 231 can move relatively flexibly in the corresponding structure of the metal piece 310 to maintain an electrically connected state.

Since the edge portion 231 and an inner wall of the slot 311 are in close contact by the cooperation of the first and second clamping pieces, after electric current is conducted from the pin 220 to the electrically conductive connector 230, it will be passed along the connecting portion 231 to the inner wall of the slot 311 in close contact with the connecting portion, and then will be conducted through the metal piece 310 to a subsequent circuit, thus achieving a complete and stable electric conduction process. This method of electrical conduction by close contact ensures the reliability of contact by virtue of the clamping structure, minimizes problems such as increased resistance, heat generation and arcing due to poor contact, and ensures the overall electrical conductivity and safety of the power plug 1000.

Figure 2:
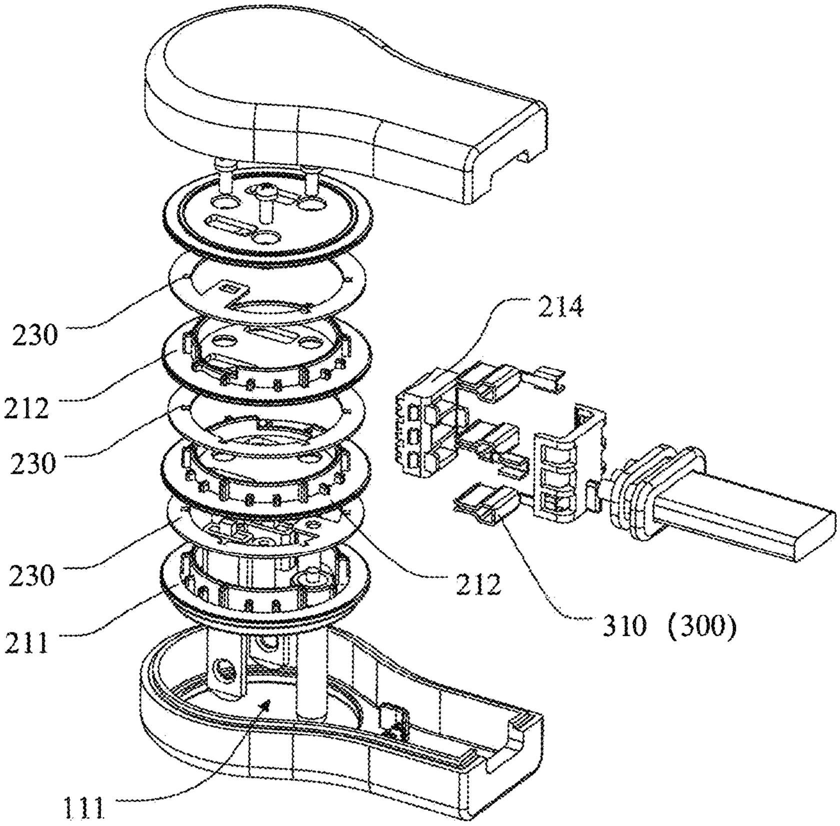
FIG. 2 is an exploded view of the power plug shown in FIG. 1.
Figure 3:
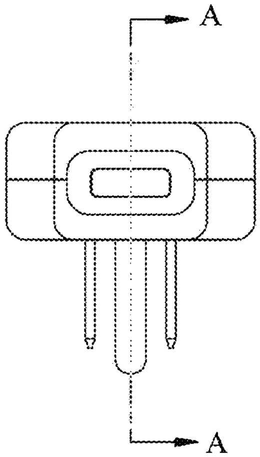
FIG. 3 is a structural diagram of the power plug, viewed from in another direction.
Figure 4:
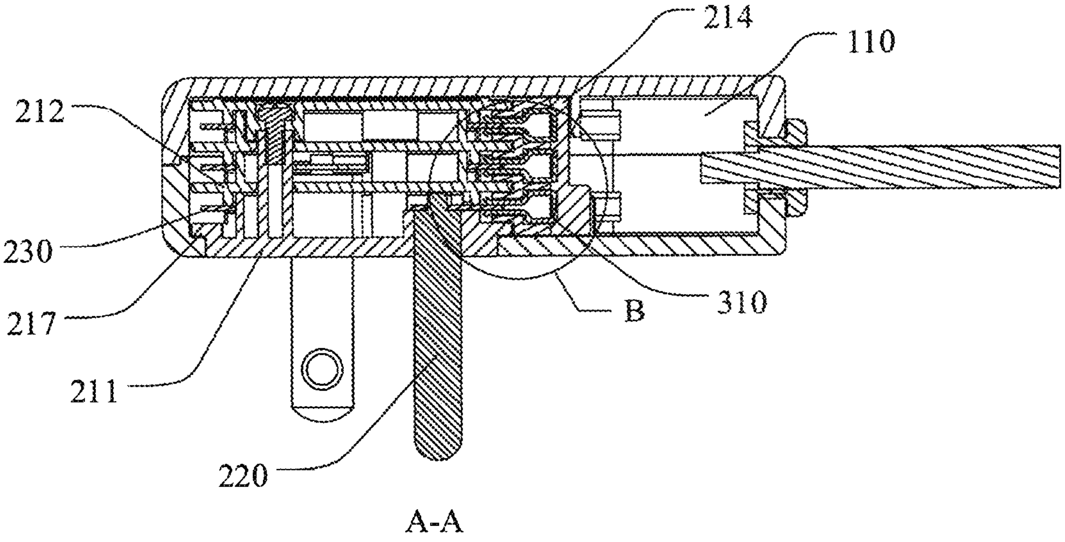
FIG. 4 is a schematic cross-sectional view taken along directions A-A in FIG. 3.

Referring to FIGS. 2 and 7, the metal piece 310 includes the first clamping piece 312 and the second clamping piece 313 that are connected to each other.

Especially, at least one of the first clamping piece 312 and the second clamping piece 313 is elastic, so that the edge portion 231 is clamped within the corresponding slot 311.

The first clamping piece 312 and the second clamping piece 313 are disposed opposite each other to clamp the edge portion 231, thereby achieving fixation and electrical connection thereof. The shapes and sizes of the first clamping piece 312 and the second clamping piece 313 are adapted to the edge portion 231 to ensure that the edge portion 231 can be accurately and securely placed within the slot 311 formed therebetween.

At least one of the first clamping piece 312 and the second clamping piece 313 is elastic, so that the first clamping piece 312 and the second clamping piece 313 can undergo some degree of deformation when subjected to an external force, and can recover to their original state after the external force disappears. For example, if the first clamping piece 312 is elastic, when the edge portion 231 of the electrically conductive connector 230 is inserted into the slot 311, the first clamping piece 312 will undergo outward elastic deformation under the pressure of the edge portion 231, thereby creating an accommodation space for the edge portion 231; and after the edge portion 231 completely enters, the first clamping piece 312 fits closely against the surface of the edge portion 231 due to its elastic restoring force, thus achieving an elastic clamping effect.

Due to the elasticity of at least one of the first clamping piece 312 and the second clamping piece 313, the slot 311 can achieve adaptive adjustment to accommodate the edge portion 231 with different size specifications within a certain tolerance range. Even if slight deviations occur in the size of the edge portion 231 during manufacturing, or the size of the edge portion 231 changes due to wear or other reasons over time with use and repeated plugging and unplugging, the slot 311 can still adjust its clamping force and fit to the edge portion 231 through the elastic deformation of the first clamping piece 312 and the second clamping piece 313, ensuring close and stable contact.

Moreover, during use of the power plug 1000, when a slight displacement or rotation of the rotatable seat 210 and the electrically conductive connectors 230 occurs, whether due to normal plugging and unplugging operations, or external factors (e.g., being subjected to vibration, occasional pulling by an external force, etc.), the metal pieces 310 can still function. When there is a small change in the position of the edge portion 231 within the slot 311, the elastic first clamping piece 312 and second clamping piece 313 will undergo corresponding deformation accordingly to adapt to this change, thereby keeping sufficient pressure on the edge portion 231 all the time, so as to maintain good electrical contacts between the connecting portion 231 and the inner walls of the clamping pieces. This dynamic elastic adjustment ensures that electric current can be continuously and stably conducted from the edge portion 231 to the metal piece 310, avoids problems such as power failure and arc generation caused by poor contact, and ensures the conductivity of the entire power plug 1000 and the normal operation of the electric equipment.

In this embodiment, the electrically conductive connector 230 and the power connection clamping member 310 may be made of a material with good electrical conductivity, such as copper or other metal materials, and relying on the elasticity of the metal piece 310 itself, the edge portion 231 is firmly clamped within the slot 311, which ensures that even if the rotatable seat 210 drives the electrically conductive connector 230 to rotate, the edge portion 231 can still be stably within the slot 311, without displacement, loosening or the like that could affect the electrical connection.

Referring further to FIG. 7, in some embodiments, each of the first clamping piece 312 and the second clamping piece 313 includes a flat segment 314 and a bent segment 315 that are connected to each other. The bent segment 315 of the first clamping piece 312 and the bent segment 315 of the second clamping piece 313 are connected by a connecting segment 316. The flat segment 314 of the first clamping piece 312 and the flat segment 314 of the second clamping piece 313 are disposed opposite and be closer to each other than the bent segments. A welding portion 317 is bent and extended from one side of the connecting segment 316 away from the first clamping piece 312, and the welding portion 317 is configured for welding the cable of the power plug.

The two flat segments 314 disposed opposite and close to each other form the slot 311, which serves to clamp the electrically conductive connector 230. The shapes of the two flat segments 314 are relatively regular and straight, and can provide relatively stable and large-area contact surfaces. When the connecting portion 231 of the electrically conductive connector 230 is placed in the slot 311, inner surfaces of the flat segments 314 fit against the opposite surfaces of the edge portion 231 to ensure a good contact effect, which facilitates stable conduction of electric current. Moreover, the opposite and close arrangement allows the slot 311 to form a relatively regular and well-enclosed space in this region, which can more effectively restrict movement of the edge portion 231 in a horizontal direction and enhances a fixing effect on the edge portion 231.

The presence of the bent segments 315 changes the overall shapes of the first clamping piece 312 and the second clamping piece 313, and by bending, allows for better adjustment of the relative positional relationship between the first clamping piece 312 and the second clamping piece 313, as well as the spatial layout of the entire metal piece 310, thereby creating favorable conditions for subsequent cooperation with other components and the realization of its own functions. For example, the bent segments 315 may allow the first clamping piece 312 and the second clamping piece 313 have a space for extension or contraction to some extent in a direction, which facilitates responding to different external force conditions or adapting to different structural needs during installation and use.

The bent segment 315 of the first clamping piece 312 and the bent segment 315 of the second clamping piece 313 are connected by the connecting segment 316. The connecting segment 316 plays a key role in connecting the two clamping pieces into a whole, and ensures that the relative positional relationship between the first clamping piece 312 and the second clamping piece 313 remains stable, so that the entire metal piece 310 has a certain degree of structural rigidity and integrity.

Figure 6:
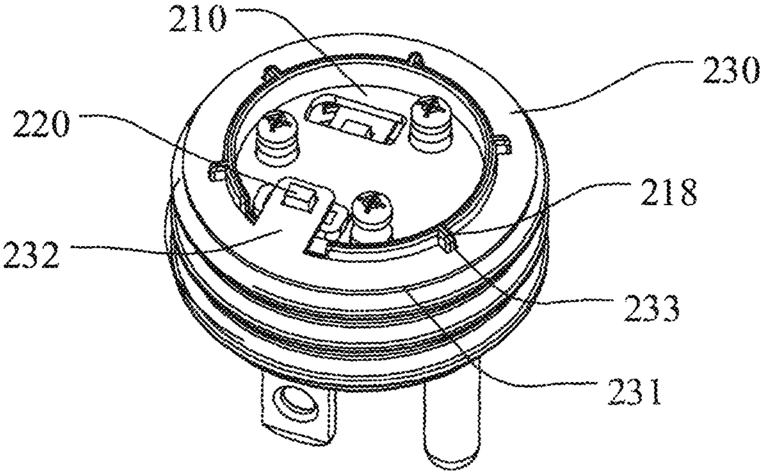
FIG. 6 is an installation diagram of an electrically conductive connector and a rotatable seat of an embodiment of the present disclosure.

Referring further to FIG. 6, in some embodiments, the electrically conductive connector 230 is in an annular sheet configuration. The electrically conductive connector 230 includes a ring and a connecting end 232 that extends into an inner space defined by the ring. The connecting end 232 is electrically connected to an end of the pin 220. The connecting ends 232 are spaced away from each other at projection plane along the plug-in direction.

The electrically conductive connector 230 adopts an annular sheet design, with the annular structure forming a closed ring in space, providing good symmetry and stability. The electrically conductive connector 230 may be evenly distributed around a center axis of the rotatable seat 210. When it rotates under the drive of the rotatable seat 210, forces on various part thereof are relatively uniform, making it not prone to deformation, damage and the like caused by uneven local forces.

The connection end 232 is located in the inner space of the ring, extends inwardly from a main body of the annular structure, and is connected to an end of the pin 220 exposed outside. Such a layout makes the connection between the pin 220 and the electrically conductive connector 230 more compact and concealed, and enables the overall structural layout to appear more organized and orderly, while reducing the likelihood of connection loosening or damage due to external factors (e.g., collision, pulling, etc.) directly affecting connection parts, thereby protecting connecting points to some degree.

In some embodiments, the connection end 232 may be connected to an end of the pin 220 using an insert-and-snap method. During plug assembly, the connection can be accomplished simply by aligning an end of the pin 220 with the connecting end 232 of the electrically conductive connector 230, and then inserting it into a corresponding snap-fit structure. The connection is convenient, and the assembly process is simple.

Referring to FIGS. 2, 5, and 6, in some embodiments, the rotatable seat 210 includes a seat 211, to which the pins 220 are attached, and at least one isolator 212 mounted on the seat 211.

Wherein an outer wall of the isolator 212 is provided with at least one annular flange 213 protruding sideward, the annular flange 213 being located between two adjacent electrically conductive connectors 230, for separating the at least two electrically conductive connectors 230.

In this embodiment, the pins 220 are fastened on the seat 211 and unrotatable relative to the seat 211, ensuring that the pins 220 can accurately interface with an external socket during use, and when the rotatable seat 210 rotates, the seat 211 rotates to take the pins 220 to rotate together, allowing the pins to be plugged into or unplugged from the socket at a suitable angle and position, thereby maintaining normal plugging and unplugging operations as well as a current conduction function.

The outwardly protruding annular flange 213 formed on an outer wall of the isolator 212 can effectively separate adjacent electrically conductive connectors 230, ensuring that the electrically conductive connectors 230 are in a state of mutual insulation, and avoiding abnormalities such as short circuits of electric current between different electrically conductive connectors 230, thereby ensuring electrical safety of the entire power plug 1000 as well as normal order of current conduction.

It should be understood that the seat 211 and the isolator 212 may be connected detachably, such as connected in a snap-fit manner. This design not only facilitates use by a user, but also allows rapid detachment and assembly of the seat 211 and the isolator 212. When replacement or repair is needed, the seat 211 can be quickly detached from the isolator 212, which improves the convenience of use and the efficiency of maintenance.

Figure 8:
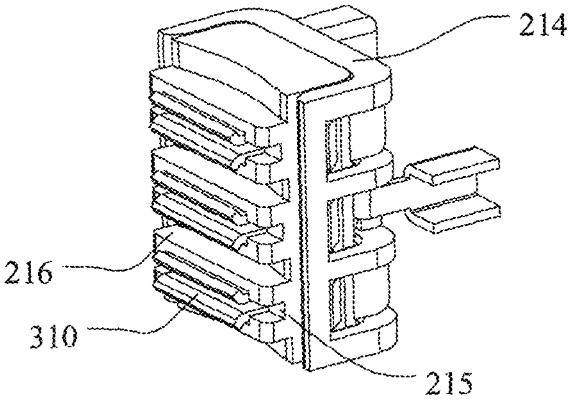
FIG. 8 is an installation diagram of an electrically conductive connector and a mounting seat of an embodiment of the present disclosure.

Referring to FIGS. 2, 5 and 8, in some embodiments, the power plug 1000 further includes a housing 214. The housing 214 is disposed within the accommodating cavity 110 and spaced apart from the isolator 212. The housing 214 is provided with at least two mounting slots 215 which are spaced apart with each other in the plug-in direction of the pins 220. Each mounting slot 215 is used to mount a metal piece 310.

The isolator 212 is mainly used to separate the electrically conductive connectors 230 to ensure insulation and independence of current conduction between the electrically conductive connectors 230, and the housing 214 provides mounting locations for the metal pieces 310. The spaced apart arrangement of the two components not only avoids mutual interference, but also enables their respective functions to be better realized. For example, it prevents accidental contact between components that may be caused by excessive proximity, which could affect electrical safety or normal clamping and electrical connection of the metal pieces 310 to the electrically conductive connectors 230.

The housing 214 is provided with at least two mounting slots 215 in the plug-in direction of the pins 220. Each mounting slot 215 is correspondingly used to mount a metal piece 310. This one-to-one correspondence mounting method enables the metal pieces 310 to be accurately and securely positioned within the mounting slots 215, ensuring that the metal pieces 310 do not move freely or become misaligned during use, thereby ensuring that their relative positional relationships with the electrically conductive connectors 230 remain stable, which is conducive to maintaining reliable electrical connections.

In this embodiment, the design of the housing 214 and its mounting slots 215 makes the layout of the assemblies inside the power plug 1000 more organized and orderly. It fully utilizes the space inside the accommodating cavity 110, avoids cluttered stacking of components or unreasonable space occupation, and improves the compactness and rationality of the internal structure of the entire power plug 1000, which is conducive to achieving more functions in a limited space, while facilitating assembly operations during the manufacturing process and improving production efficiency.

In some embodiments, the housing 214 is provided with at least one recess 216 in the plug-in direction of the pins 220, and the annular flange 213 is at least partially accommodated within the recess 216.

The at least partial accommodation of the annular flange 213 within the avoidance recess 216 allows the isolator 212 and the housing 214 to form a nested configuration in space. An outwardly protruding portion of the annular flange 213 can be accurately embedded in the avoidance recess 216, enabling the isolator 212 and the housing 214 to be more closely integrated structurally, while ensuring that there is no conflict in their spatial layout, avoiding an impact on normal assembly and functional implementation of the internal structure of the entire power supply plug 1000 due to mutual interference.

In this embodiment, the design of the recess 216 accommodating the annular flange 213 enables the isolator 212 to perform its separating function in a correct position, thereby preventing electrical failures such as short circuits between the electrically conductive connectors 230. Furthermore, it also helps to maintain accurate correspondence and good electrical connection between the metal pieces 310 and the electrically conductive connectors 230, so that spatial positions of the assemblies are precisely coordinated, and disruption to original conductive paths and insulation layout due to spatial conflicts is avoided, thereby ensuring the overall current conduction function and electrical safety of the power plug 1000.

In some embodiments, an outer peripheral wall of the rotatable seat 210 is provided with an annular rib 217 protruding therefrom. The annular rib 217 is configured to abut against an inner side edge of the cavity opening 111. During assembly and use of the power plug 1000, the annular convex rib 217 abutting against the inner side edge of the cavity opening 111 can effectively limit movement of the rotatable seat 210 in the plug-in direction of the pins 220 (i.e., an axial direction). For example, in normal use, even if the power plug is pulled by an external force or is subjected to an acting force during plugging or unplugging, the abutment of the annular rib 217 against the edge of the cavity opening 111 can prevent the rotatable seat 210 from being dislodged from the accommodating cavity 110, and maintain a relatively stable connection and cooperative relationship between the assemblies, thereby ensuring structural integrity of the entire power supply plug 1000 as well as normal performance of functions of various components.

In addition, one of the electrically conductive connection member 230 and the rotatable seat 210 is provided with a limiting slot 233, and the other thereof is provided with a limiting post 218 adapted to the limiting slot 233. The limiting post 218 and the limiting slot 233 are snap-fitted to connect the electrically conductive connection member 230 and the rotatable seat 210.

This embodiment achieves a reliable connection between the electrically conductive connector 230 and the rotatable seat 210 through the snap-fitting of the limiting post 218 and the limiting slot 233. During assembly of the power plug 1000, aligning the limiting post 218 with the limiting slot 233 and inserting the limiting post into the limiting slot enables the electrically conductive connector 230 to be securely mounted to the rotatable seat 210. The position of the electrically conductive connector 230 is thus determined, thereby preventing it from moving freely or becoming misaligned on the rotatable seat 210. For example, during rotation of the rotatable seat 210, the cooperation between the limiting slot 233 and the limiting post 218 can ensure synchronous movement of the electrically conductive connector 230 with the rotatable seat 210, maintain a stable relative positional relationship between conductive circuits, and ensure that electric current can be conducted along an established path, without problems such as open circuits or short circuits caused by displacement of the electrically conductive connector 230.

Compared with some connection methods that require complex screw fixing and welding, it is easier and faster to operate by simple snap-fitting. Workers only need to insert the limiting post 218 into the limiting groove 233 to accomplish the connection, which reduces the requirements for workers' operating skills, while improving assembly speed and efficiency. Moreover, since the shapes and sizes of the limiting slot 233 and the limiting post 218 are precisely matched, the accuracy of the installation position of the electrically conductive connector 230 on the rotatable seat 210 can be ensured, thereby improving assembly precision, and reducing product quality problems caused by assembly errors.

Figure 9:
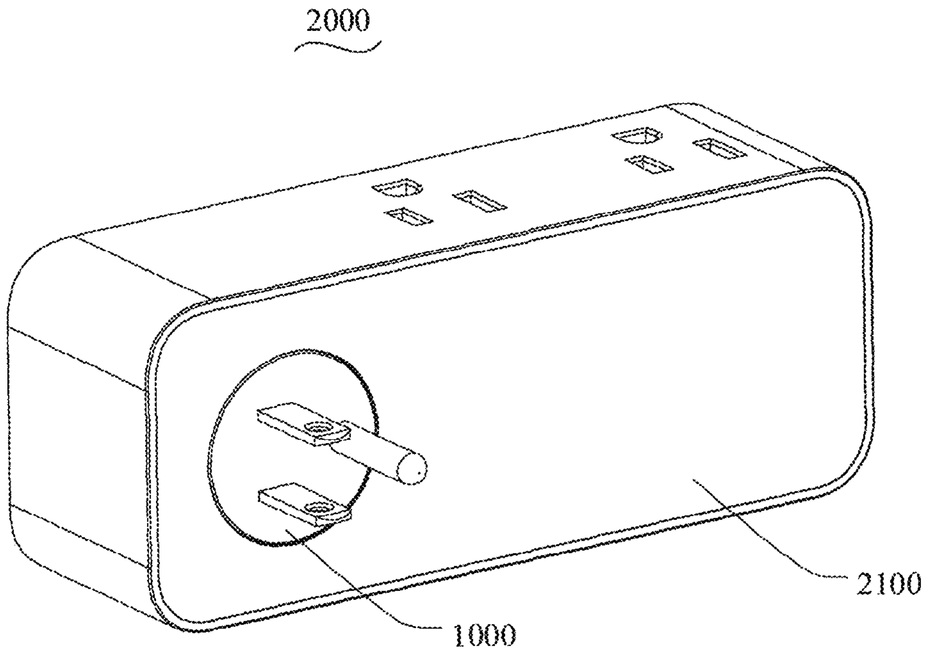
FIG. 9 is a structural diagram of an embodiment of a conversion socket of the present disclosure.

Referring to FIG. 9, a conversion socket 2000, which includes a socket body 2100 and the power plug 1000 as described above integrated with the socket, is also provided in the present disclosure. The socket body 2100 may share a same casing with the power plug 1000. One or more socket holes are defined in the casing from inserting electrical pins of another plug. The power plug 1000 is disposed in the socket body 2100, with the at least two pins 220 being located on an outer side of the socket body 2100. Due to providing the power plug 1000, the conversion socket 2000 can rotate relative to a wall socket after the power plug 1000 of the conversion socket 2000 is plugged into the wall socket, to avoid interference with another electrical appliance plug that is plugged in the wall socket.

Since the conversion socket 2000 adopts all the technical solutions of all embodiments of the power plug 1000 described above, the conversion socket 2000 of the present invention also has at least all the beneficial effects brought about by the technical solutions of the embodiments described above, which will not be repeated here.

What is claimed is:

1. A power plug, comprising:

a casing defining an accommodating cavity, the accommodating cavity including a cavity opening communicating with an exterior of the casing;

at least two pins partly received in the accommodating cavity and protruding out of the casing through the cavity opening, the at least two pins being movable relative to the casing, the at least two pins defining a plug-in direction along which the at least two pins are insertable into a socket;

at least two conductive connectors electrically connected with the at least two pins, respectively, and movable together with the at least two pins; and, at least two metal pieces received in the accommodating cavity and configured to be electrically connected to a cable of the power plug, the at least two metal pieces being electrically connected with the at least two conductive connectors, respectively, so as to be electrically coupled to the at least two pins;

wherein each of the at least two metal pieces provides a first force and a second force onto a corresponding conductive connector of the at least two conductive connectors, the first force presses the conductive connector toward the plug-in direction of the power plug, the second force presses the conductive connector toward a direction opposite to the plug-in direction of the power plug;

wherein the power plug further comprises a rotatable seat rotatably disposed in the accommodating cavity, the at least two pins are attached to the rotatable seat and move as the rotatable seat rotates, the at least two metal pieces are unmovable relative to the casing when the at least two pins move;

wherein each of the at least two conductive connectors includes a metal plate, the metal plates of the at least two conductive connectors are stacked along the plug-in direction above the at least two pins, an edge portion is formed at each metal plate, when the edge portions are driven to move together with the rotatable seat, due to the first and second forces applied on opposite surfaces of each edge portion, each edge portion and the corresponding metal piece maintain continuous contact.

2. The power plug according to claim 1, wherein, each of the at least two metal pieces includes a first clamping piece and a second clamping piece opposite the first clamping piece, the second clamping piece engages with the first clamping piece to clamp the corresponding edge portion, and a slot between the first and the second clamping pieces faces the corresponding edge portion, the corresponding edge portion is insertable into the slot and electrically connected with the first and second clamping pieces.

3. The power plug according to claim 1, wherein, one isolator is mounted between two adjacent metal plates of the metal plates of the at least two conductive connectors for spaced the adjacent metal plates to be in a state of mutual insulation.

4. The power plug according to claim 3, wherein, the isolator includes an annular flange protruding laterally, the annular flange being located between the two adjacent metal plates for spacing the metal plates.

5. The power plug according to claim 3, wherein, the rotatable seat, the isolator and the conductive connectors are stacked and arranged along the plug-in direction, and the at least two metal pieces are arranged beside the isolator and the conductive connectors.

6. The power plug according to claim 5, further comprising, a housing disposed in the accommodating cavity and fastened to the casing, the housing forming at least two mounting slots arranged along the plug-in direction, each mounting slot receiving one of the at least two metal pieces.

7. The power plug according to claim 1, wherein, each of the at least two conductive connectors further includes an annular sheet and a connecting end extending outward from inner edge of the annular sheet, the connecting end is connected to an end of the pin.

8. A power plug comprising:

at least two electrical pins configured for connecting to a power source;

at least two first conductive members, each is connected with one of the at least two electrical pins, each of the at least two first conductive members including two opposite surfaces; and, at least two second conductive members, each is connected with one of the at least two first conductive members, wherein, the at least two electrical pins and the at least two first conductive members are movable together relative to the at least two second conductive members; the at least two second conductive members press against opposite surfaces of the at least two first conductive members;

wherein each of the at least two second conductive members includes a receiving space, a connecting portion is formed on each of the at least two first conductive members and received in the receiving space, the connecting portion is rotatable in the receiving space and engageable with a corresponding one of the at least two second conductive members, wherein the connecting portion has a circular structure, and an area of the connecting portion in the receiving space remains constant when the connecting portion moves.

9. The power plug according to claim 8, wherein each of the at least two second conductive members comprises a first clamping portion and a second clamping portion opposite the first clamping portion, the receiving space is defined between the first clamping portion and the second clamping portion, the connecting portion is clamped in the receiving space.

10. The power plug according to claim 9, wherein the first clamping portion comprises a first clamping plate and a first fixing plate, the first fixing plate is bent and extended from one side of the first clamping plate, and the side of the first clamping plate is located away from the connecting portion, the second clamping portion comprises a second clamping plate and a second fixing plate, the second fixing plate is bent and extended from one side of the second clamping plate, and the side of the second clamping plate is located away from the connecting portion, the receiving space is defined between the first clamping plate and the second clamping plate.

11. The power plug according to claim 10, wherein a connecting plate is coupled to the first fixing plate and the second fixing plate, a welding portion is bent and extended from one side of the connecting plate away from the first clamping plate, and the welding portion is configured for welding the cable of the power plug.

12. The power plug according to claim 9, wherein an isolation plate is installed between two adjacent first conductive members of the at least two first conductive members for spacing away the two adjacent first conductive members and preventing the two adjacent first conductive members from electrically contacting with each other;

an orthographic projection of the isolation plate coincides with an orthographic projection of the connecting portion, a protruding portion is protruded from the isolation plate, an orthographic projection of the protruding portion covers the orthographic projection of the connecting portion.

13. The power plug according to claim 12, wherein a mounting member configured for assembling the second conductive members is accommodated beside the protruding portion, at least two mounting grooves are defined in the mounting member, and the at least two mounting grooves are arranged side by side at interval along a plug-in direction, each mounting groove corresponds to one second conductive member for receiving the one second conductive member, an inner side wall of the mounting groove is respectively abutted against the first clamping portion and the second clamping portion, when the connecting portion is inserted into the receiving space, the mounting groove presses at least one of the first clamping portion or the second clamping portion.

14. The power plug according to claim 13, wherein an insertion space is formed between two adjacent mounting grooves, and the protruding portion is received in the insertion space.

15. The power plug according to claim 12, wherein at least one fixing block is protruded from the isolation plate towards the first conductive members, each first conductive member defines at least one fixing hole corresponding to the fixing block, the fixing block is inserted into the fixing hole and latched on an inner sidewall of the fixing hole.

16. The power plug according to claim 8, wherein each first conductive member has a circular structure, a protrusion is formed on each conductive member and protrudes toward a center of the circle structure, two adjacent protrusions are oppositely arranged and correspond to the at least two electrical pins, each protrusion defines a mounting hole, each of the at least two electrical pins passes through the mounting hole and is electrically connected to the first conductive member.

* * * * *